(12) United States Patent
Sha et al.

(10) Patent No.: US 9,109,459 B2
(45) Date of Patent: Aug. 18, 2015

(54) APPARATUS AND SYSTEMS FOR SEALING A ROTARY MACHINE USING A SELF-CLEANING FACE SEAL

(71) Applicant: General Electric Company, Schenectady, NY (US)

(72) Inventors: Shaik Karimulla Sha, Anantapur (IN); Xiaoqing Zheng, Niskayuna, NY (US); Azam Mihir Thatte, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 14/076,974

(22) Filed: Nov. 11, 2013

(65) Prior Publication Data

US 2015/0130137 A1 May 14, 2015

(51) Int. Cl.
*F16J 15/34* (2006.01)
*F16J 15/32* (2006.01)
*F01D 11/00* (2006.01)

(52) U.S. Cl.
CPC ........... *F01D 11/003* (2013.01); *F16J 15/3288* (2013.01); *F16J 15/34* (2013.01); *F16J 15/3408* (2013.01); *F16J 15/3496* (2013.01)

(58) Field of Classification Search
CPC ..... F16J 15/34; F16J 15/3408; F16J 15/3496; F16J 15/3288
See application file for complete search history.

(56) References Cited

U.S. PATENT DOCUMENTS

| | | | |
|---|---|---|---|
| 3,926,442 A | 12/1975 | Muller | |
| 5,399,024 A | 3/1995 | Shapiro | |
| 5,769,604 A * | 6/1998 | Gardner et al. | 415/170.1 |
| 5,828,137 A | 10/1998 | Selfors et al. | |
| 6,152,452 A | 11/2000 | Wang | |
| 6,234,490 B1 | 5/2001 | Champlin | |
| 6,416,057 B1 * | 7/2002 | Adams et al. | 277/355 |
| 6,446,976 B1 | 9/2002 | Key et al. | |
| 7,004,119 B2 | 2/2006 | Dardalis | |
| 7,044,470 B2 | 5/2006 | Zheng | |
| 7,261,300 B2 | 8/2007 | Agrawal et al. | |
| 7,967,558 B2 * | 6/2011 | Scricca | 415/173.7 |
| 8,167,545 B2 | 5/2012 | Glahn et al. | |
| 2005/0110218 A1 * | 5/2005 | Morrison et al. | 277/358 |
| 2007/0132190 A1 * | 6/2007 | Trabert | 277/355 |
| 2009/0304493 A1 * | 12/2009 | Awtar | 415/1 |
| 2010/0135607 A1 * | 6/2010 | Rogall et al. | 384/477 |
| 2012/0251290 A1 * | 10/2012 | Turnquist et al. | 415/1 |

FOREIGN PATENT DOCUMENTS

| | | |
|---|---|---|
| EP | 1299663 B1 | 9/2006 |
| EP | 1412663 B1 | 2/2007 |
| EP | 2233700 A1 | 9/2010 |
| EP | 2233700 B1 | 5/2012 |

* cited by examiner

*Primary Examiner* — Kristina Fulton
*Assistant Examiner* — Nicholas L Foster
(74) *Attorney, Agent, or Firm* — Armstrong Teasdale LLP

(57) ABSTRACT

A self-cleaning hydrodynamic face seal for use with a rotary machine is provided. The hydrodynamic face seal includes a seal ring having a radially-extending seal face. In addition, the hydrodynamic face seal includes at least one brush coupled to the seal ring. The at least one brush includes a plurality of flexible elements extending away from the radially-extending seal face of the face seal ring.

19 Claims, 6 Drawing Sheets

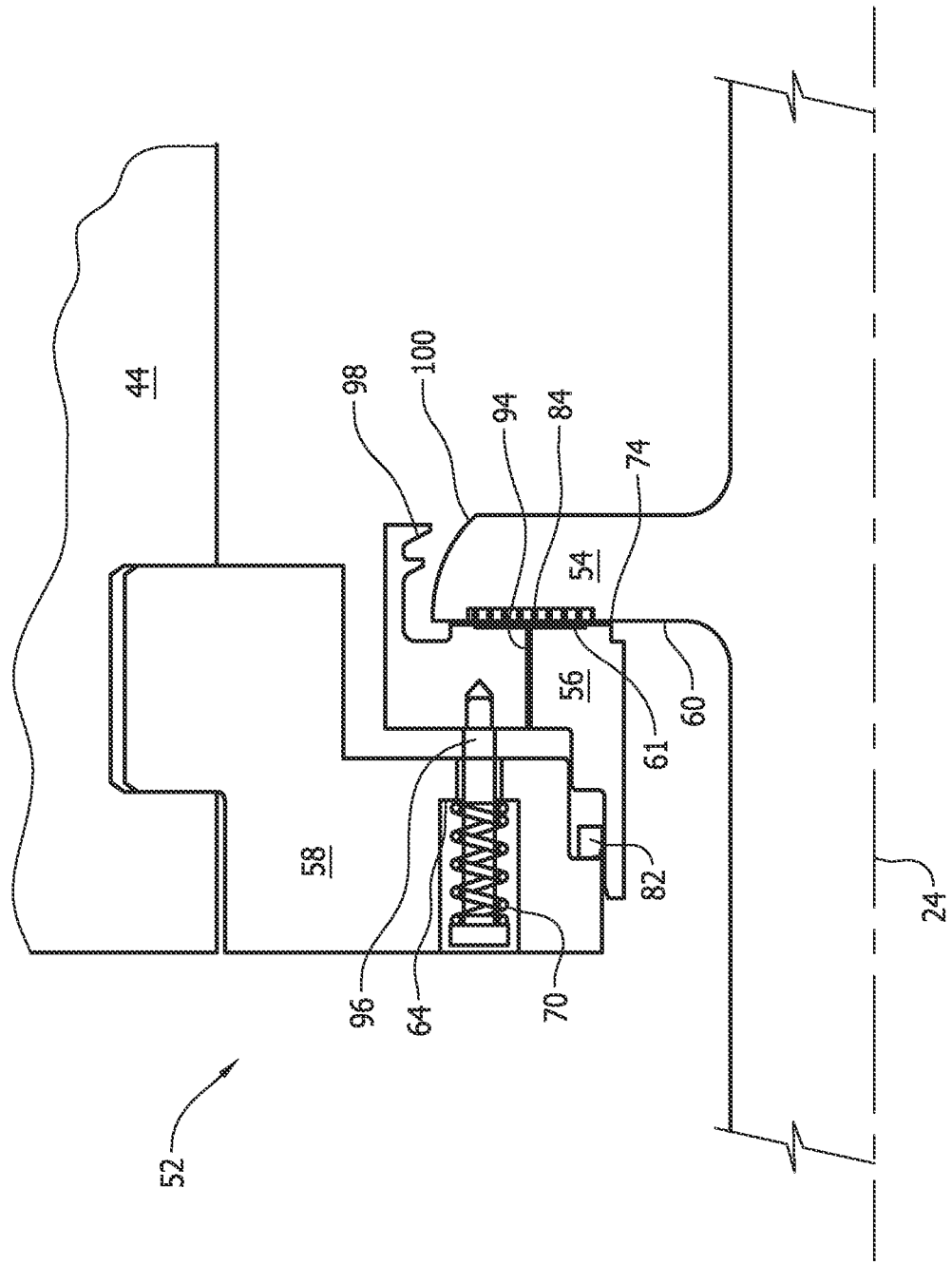

APPARATUS AND SYSTEMS FOR SEALING A ROTARY MACHINE USING A SELF-CLEANING FACE SEAL

BACKGROUND OF THE INVENTION

This application relates generally to rotary machines and more particularly, to apparatus and systems for sealing a rotary machine.

At least some rotary machines, such as steam turbine engines, have a defined fluid flow path extending therethrough. The flow path includes, in a serial-flow relationship, a fluid inlet, a turbine, and a fluid outlet. The process fluid may contain debris or solid particles within the system. The debris or solid particles may deposit on internal components and seals of the rotary machine, and may affect turbine engine performance.

Some rotary machines use a plurality of sealing assemblies in the flow path and endpacking regions to facilitate increasing the operating efficiency of the rotary machine. Generally, known seal assemblies are coupled between a stationary component and a rotary component to provide sealing between a high-pressure area and a low-pressure area. Several known sealing assemblies include flexible members such as brush seals, labyrinth teeth, and hydrodynamic face seals.

In some known rotary machines, hydrodynamic face seals may be used to facilitate reducing leakage of a pressurized process fluid through a gap between two components. Hydrodynamic face seals generally include a mating (rotating) ring and a seal (stationary) ring. Generally, shallow hydrodynamic grooves are formed or etched on the mating ring face. During operation, the hydrodynamic grooves in the rotating ring generate a hydrodynamic force that causes the stationary ring to lift or separate from the rotating ring such that a small gap is created between the two rings. A sealing gas flows through the gap between the rotating and stationary rings. Large debris may not be able to enter the small gap between the mating ring and seal ring; however, fine solid particles and contaminants in the process fluid may be able to enter the gap and become caught in the hydrodynamic grooves of the rotating and/or stationary rings.

In some known rotary machines, such as gas turbine engines, maintenance of face seals may be relatively straightforward. At least some known face seals in gas turbines engines may be easily disassembled from the rotating shaft and cleaned of any debris buildup. However, is some known rotary machines, such as steam turbine engines, maintenance of face seals may be challenging. At least some known steam turbine engines may be operated continuously for a period of years, thus facilitating the buildup of debris and contaminants in the grooves of the rings of the face seal. In addition, at least some known steam turbine engines are extremely large, containing rotatable shafts with diameters larger than 20 inches. Such large internal components add to the complexity of maintenance of the seals of such known steam turbine engines.

BRIEF DESCRIPTION OF THE INVENTION

In one aspect, a hydrodynamic face seal for use with a rotary machine is provided. The hydrodynamic face seal includes a seal ring having a radially-extending seal face. In addition, the hydrodynamic face seal includes at least one brush coupled to the seal ring. The at least one brush includes a plurality of flexible elements extending away from the radially-extending seal face of the face seal ring.

In another aspect, a rotary machine is provided. The rotary machine includes a casing and a rotatable shaft defining a centerline axis. The rotary machine also includes a sealing system including a first seal ring having a first primary sealing surface. The first seal ring is coupled to the rotatable shaft. The sealing system also includes a second seal ring including a second primary sealing surface. In addition, the sealing system includes at least one brush coupled to at least one of the first seal ring and the second seal ring. The at least one brush includes a plurality of flexible elements. Further, the sealing system includes a coupling device coupled to the second seal ring and moveable therewith.

In yet another aspect, method of assembling a sealing system is provided. The method includes coupling a coupling device to an inner surface of a casing of a rotary machine. The method also includes coupling a first seal ring including a first primary sealing surface to a rotatable shaft of the rotary machine. The method further includes releasably coupling a second seal ring including a second primary sealing surface concentrically to the first seal ring. In addition, the method includes coupling at least one brush to at least one of the first seal ring and the second seal ring. The at least one brush includes a plurality of flexible elements.

BRIEF DESCRIPTION OF THE DRAWINGS

FIG. 5 is a front view of a stationary seal ring of the face seal of

FIG. 3; and

FIG. 6 is a schematic section view of an alternative exemplary self-cleaning hydrodynamic face seal for use with the steam turbine engine shown in FIG. 1.

DETAILED DESCRIPTION OF THE INVENTION

The exemplary apparatus and systems described herein overcome at least some of the disadvantages associated with rotary machines that may operate with process fluid leakage from the rotary machine to the external environment. The embodiments described herein provide a self-cleaning sealing assembly that substantially reduces process fluid leakage from a rotary machine, thus facilitating improving rotary machine performance. More specifically, the sealing assembly described herein is a self-cleaning hydrodynamic face seal that includes a plurality of brushes positioned between the seal ring faces that continuously remove foreign material, such as debris and contaminants, deposited in the hydrodynamic features by the process fluid, such as steam used in a steam turbine engine.

Figure 1:
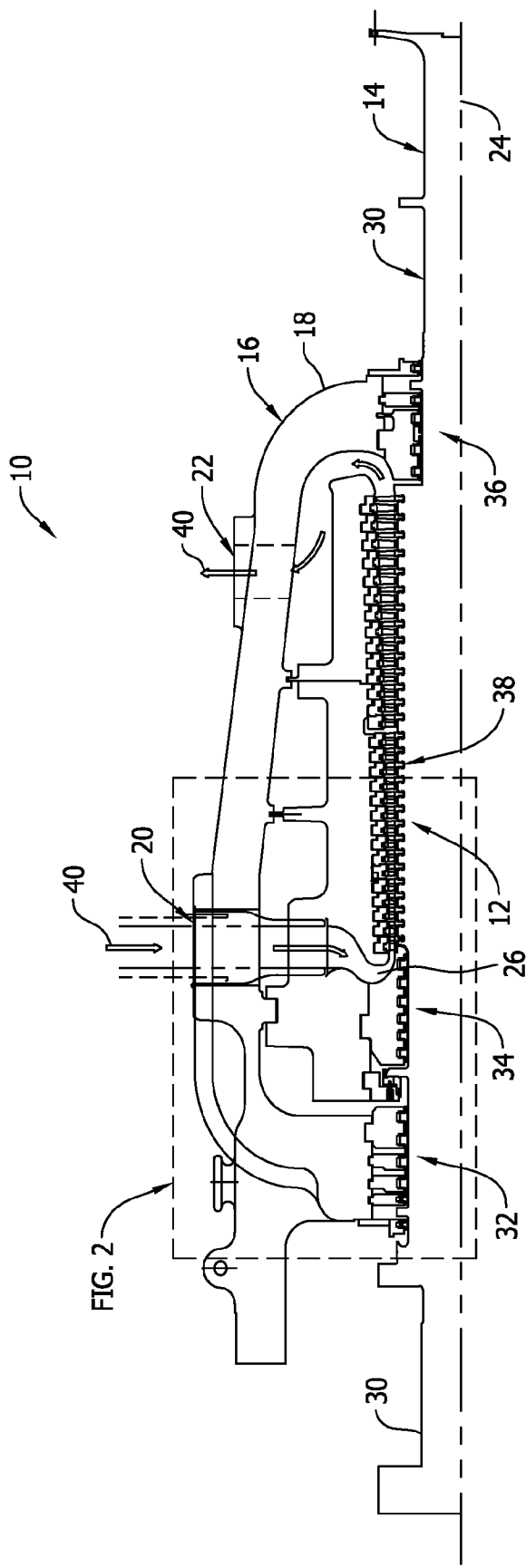
FIG. 1 is a schematic view of an exemplary steam turbine engine.

FIG. 1 is a schematic view of an exemplary steam turbine engine 10. While FIG. 1 describes an exemplary steam turbine engine, it should be noted that the sealing apparatus and systems described herein is not limited to any one particular type of turbine engine. One of ordinary skill in the art will appreciate that the current sealing apparatus and systems described herein may be used with any rotary machine, including a gas turbine engine, in any suitable configuration that enables such an apparatus and system to operate as further described herein.

In the exemplary embodiment, steam turbine engine 10 is a single-flow steam turbine engine. Alternatively, steam turbine engine 10 may be any type of steam turbine, such as, without limitation, a low-pressure turbine, an opposed-flow, high-pressure and intermediate-pressure steam turbine combination, a double-flow steam turbine engine, and/or the like. Moreover, as discussed above, the present invention is not limited to only being used in steam turbine engines and can be used in other turbine systems, such as gas turbine engines.

In the exemplary embodiment, steam turbine engine 10 includes a plurality of turbine stages 12 that are coupled to a rotatable shaft 14. A casing 16 is divided into an upper half section 18 and a lower half section (not shown). The turbine engine 10 includes a high pressure steam inlet conduit 20 and a low pressure steam exhaust conduit 22. Shaft 14 extends through casing 16 along a centerline axis 24. Shaft 14 is supported at opposite end portions 30 of shaft 14 by journal bearings (not shown). A plurality of end packing regions or sealing members 32, 34, and 36 are coupled between rotatable shaft end portions 30 and casing 16 to facilitate sealing casing 16 about shaft 14.

During operation, high pressure and high temperature steam 40 is channeled to turbine stages 12 from a steam source, such as a boiler or the like (not shown), wherein thermal energy is converted to mechanical rotational energy by turbine stages 12. More specifically, steam 40 is channeled through casing 16 via steam inlet conduit 20 into an inlet bowl 26 where it impacts a plurality of turbine blades or buckets 38 coupled to shaft 14 to induce rotation of shaft 14 about centerline axis 24. Steam 40 exits casing 16 at steam exhaust conduit 22. Steam 40 may then be channeled to a reheat boiler (not shown) where it may be reheated or channeled to other components of the system, e.g., a low pressure turbine section or a condenser (not shown).

Figure 2:
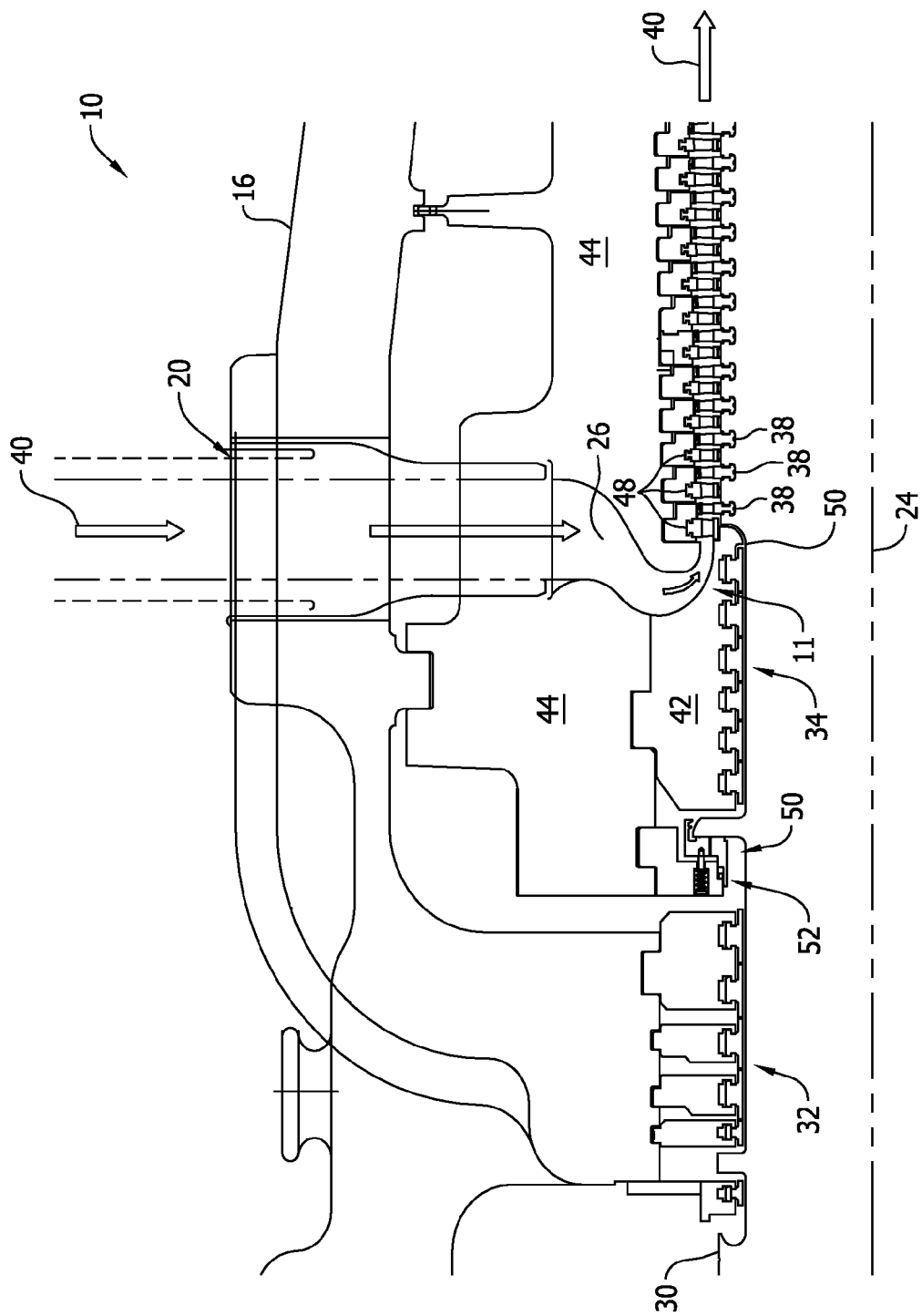
FIG. 2 is a more detailed schematic view of a portion of the steam turbine engine of FIG. 1 taken about an area defined in FIG. 1.

FIG. 2 is a more detailed schematic view of a portion of steam turbine engine 10 taken about area 2 defined in FIG. 1. In the exemplary embodiment shown in FIG. 2, steam turbine engine 10 includes shaft 14, a stator component 42 coupled to an inner shell 44 of casing 16, and a plurality of sealing members 34 attached to stator component 42. Casing 16, inner shell 44, and stator component 42 each extend circumferentially about shaft 14 and sealing members 34. In the exemplary embodiment, sealing members 34 form a tortuous sealing path between stator component 42 and shaft 14. Shaft 14 includes a plurality of turbine stages 12 through which high-pressure high-temperature steam 40 is passed via one or more inlet bowls 26 at an inlet side 11 of steam turbine engine 10. The turbine stages 12 include a plurality of inlet nozzles 48. Steam turbine engine 10 may include any number of inlet nozzles 48 that enables steam turbine engine 10 to operate as described herein. For example, steam turbine engine 10 may include more or fewer inlet nozzles 48 than shown in FIG. 2. The turbine stages 12 also include a plurality of turbine blades or buckets 38. Steam turbine engine 10 may include any number of buckets 38 that enables steam turbine engine 10 to operate as described herein. For example, steam turbine engine 10 may include more or fewer buckets 38 than are illustrated in FIG. 2. Steam 40 enters inlet bowl 26 through steam inlet conduit 20 and passes down the length of shaft 14 through turbine stages 12.

A portion of the admitted high-pressure high-temperature steam 40 passes through the end packing sealing members 34 via a leakage region 50. The loss of steam 40 through leakage region 50 results in a loss of efficiency of steam turbine engine 10. As described above, to reduce the leakage of steam 40 through the end packing region 32, in the exemplary embodiment, steam turbine engine 10 includes a unique self-cleaning hydrodynamic face seal, generally indicated at 52.

Figure 3:
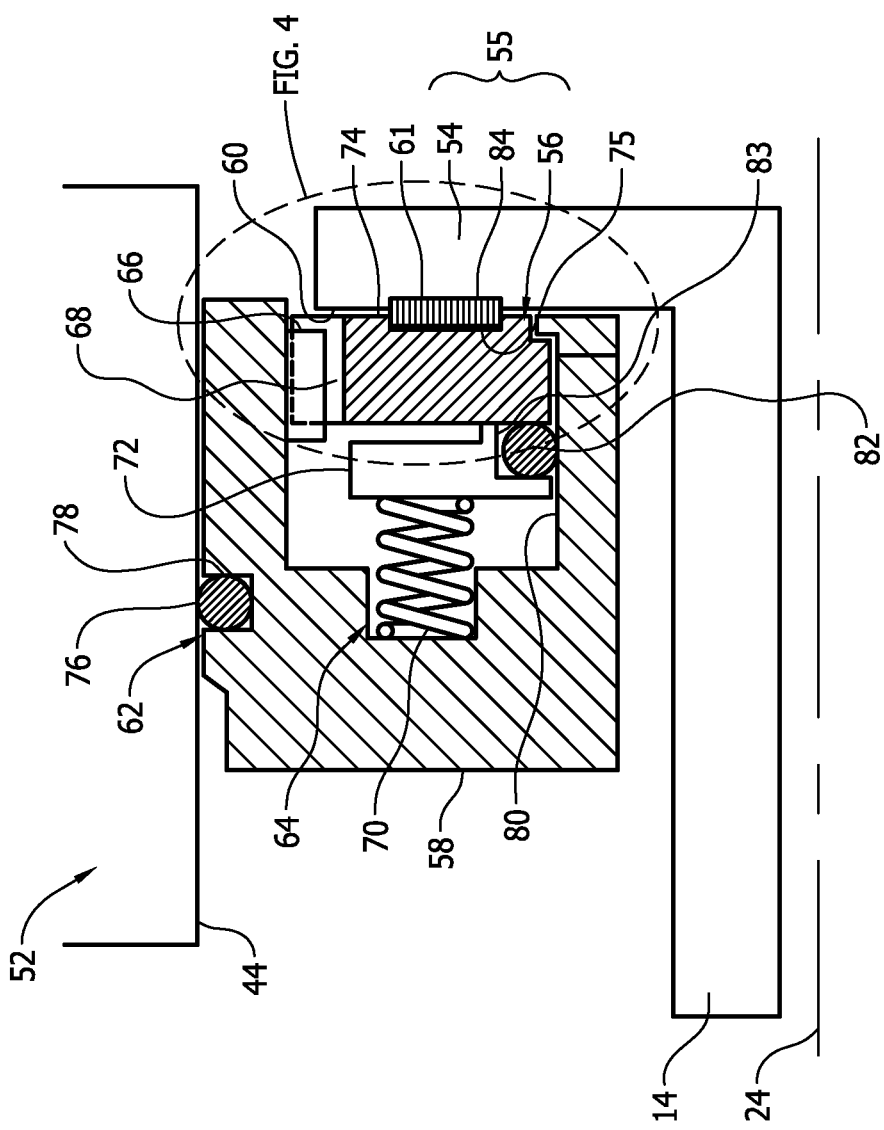
FIG. 3 is a schematic section view of a self-cleaning hydrodynamic face seal for use with the steam turbine engine shown in FIG. 1.

FIG. 3 is a schematic section view of a self-cleaning hydrodynamic face seal 52 that may be used with steam turbine engine 10 (shown in FIG. 1.) In the exemplary embodiment, face seal 52 facilitates reducing or preventing leakage of a pressurized process fluid, e.g., steam 40, between a region of relatively high pressure and an area of relatively low pressure. However, foreign material, such as contaminants or debris, in steam 40 deposited in face seal 52 causes face seal 52 to operate less effectively.

In the exemplary embodiment, face seal 52 is a high pressure seal positioned between shaft 14 and inner shell 44 of casing 16 on an inlet side of turbine stages 12. As described above, although a steam turbine engine 10 is illustrated, face seal 52 may be used in any application where a self-adjusting seal is desirable or required. In the exemplary embodiment, face seal 52 includes a rotating seal ring 54, a stationary seal ring 56, and a seal housing 58 concentric with and extending about centerline axis 24 of shaft 14. Rotating seal ring 54 and stationary seal ring 56 together form a primary seal 55.

In the exemplary embodiment, rotating seal ring 54 is coupled to shaft 14 and is rotatable therewith. Alternatively, rotating seal ring 54 may be formed as an integral part of shaft 14. In the exemplary embodiment, rotating seal ring 54 is generally disk shaped and includes an axially-facing, first primary sealing surface 60 that includes hydrodynamic features such as channels or grooves 61 defined therein. Channels or grooves 61 direct process fluid, e.g., steam 40, between rotating seal ring 54 and stationary seal ring 56, thus forming a process fluid film layer that is generally about 0.002 inches thick or less. Alternatively or additionally, channels or grooves 61 may be formed in a primary sealing surface 74 of stationary seal ring assembly 56.

Stationary seal ring 56 is generally disk-shaped and has a radially-extending surface defining an axially-facing, second primary sealing surface 74. Second primary sealing surface 74 is positioned against first seal component 54 in a face-to-face mating relationship with first primary sealing surface 60. First and second primary sealing surfaces 60, 74 form a circuitous or tortuous flow path for the fluid, e.g., steam 40.

In the exemplary embodiment, stationary seal ring 56 has a smooth second primary sealing surface 74. Alternatively, second primary sealing surface 74 may include hydrodynamic features such as channels or grooves 75 defined therein. In the exemplary embodiment, a biasing back ring 72 is shown as a separate component from seal ring 56. Alternatively, biasing back ring 72 and seal ring 56 may be formed integrally as a single component. A secondary seal 82 is positioned therein. Stationary seal ring 56 includes at least one alignment slot 68 that aligns with and is slidably coupled to a respective alignment member 66 of seal housing 58. Alignment slot 68 is formed through stationary seal ring 56 about on outer edge of stationary seal ring 56. Alternatively, stationary seal ring 56 may include any number of alignment slots 68 radially spaced apart about the outer edge of stationary seal ring 56. The tongue-in-slot coupling operates as an anti-rotation feature to prevent secondary primary sealing ring 56 from rotating with first primary rotating ring 54.

Seal housing 58 is configured to couple stationary seal ring 56 to inner shell 44 of casing 16. Seal housing 58 is a non-rotating, axially-extending component that includes a radially-facing secondary sealing surface 80. Seal housing 58 also includes one or more spring seats 64. Seal housing 58 includes a radially-inward extending alignment member 66 that is coupled to an alignment slot 68 of stationary seal ring 56. Stationary seal ring 56 is coupled to seal housing 58 such that stationary seal ring 56 is axially movable along centerline axis 24 and is not laterally or rotatably moveable. In some embodiments, seal housing 58 may be integrated with inner shell 44 of casing 16. Furthermore, in some alternative embodiments, stationary seal ring 56 may be coupled directly to inner shell 44 or to stator component 42.

One or more biasing components 70, such as a spring, extend between spring seat 64 and a radially-extending biasing ring 72 of stationary seal ring 56. Biasing component 70 biases stationary seal ring 56 away from first seal component 54. Alternatively, biasing component 70 may be configured to bias stationary seal ring 56 towards first seal component 54.

A structural seal 76 is positioned in a groove 78 in seal housing 58. In the exemplary embodiment, structural seal 76 is an O-ring. Alternatively, structural seal 76 may be any type of seal that enables face seal 52 to operate as described herein, such as, for example, a C-seal, an E-seal, or a brush seal. Structural seal 76 prevents leakage of process fluid between inner shell 44 and seal housing 58. Secondary seal 82 is positioned in a notch or groove 83 formed in biasing ring 72 and engages/slides on secondary sealing surface 80. In the exemplary embodiment, secondary seal 82 is an O-ring. Alternatively, secondary seal 82 may be any type of seal that enables face seal 52 to operate as described herein, such as, for example, a C-seal, E-seal, or a brush seal. Secondary seal 82 provides sealing against biasing ring 72 to prevent leakage of process fluid between seal housing 58 and secondary primary ring 56 and/or biasing ring 72.

Figure 4:
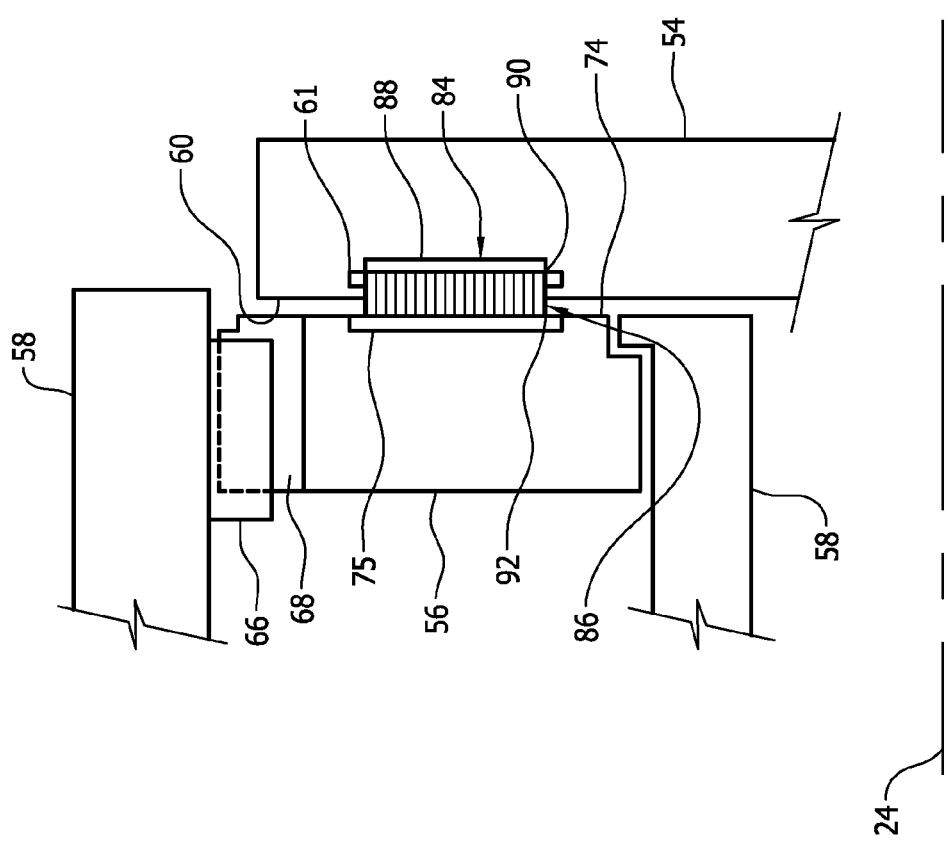
FIG. 4 is a more detailed schematic view of a portion of face seal taken about an area defined in FIG. 3.

FIG. 4 is a more detailed schematic view of a portion of face seal 52 taken about area 4 illustrated in FIG. 3. Referring to FIGS. 3 and 4, in the exemplary embodiment, rotating seal ring 54 includes a brush 84. In the exemplary embodiment, brush 84 is linear, i.e., formed in a substantially straight line. Alternatively, brush 84 may be formed in any configuration that permits brush 84 to operate as described herein. In alternative embodiments, stationary seal ring 56 may include brush 84, or both rotating seal ring 54 and stationary seal ring 56 may include brush 84. Brush 84 includes a plurality of flexible elements 86, coupled to a holding device 88. It should be noted herein that the term "flexible element" may be referred to as an element that is capable of being bent without breaking the element. In some embodiments, the plurality of flexible elements 86 comprises bristles, which may include metallic or non-metallic bristles or a combination of metallic and non-metallic bristles. In some embodiments, the flexible elements 86 may include metal alloy, for example, a cobalt alloy, such as HAYNES 25®. A flexible bristle is a cantilevered beam whose radial stiffness is defined by the length, cross-sectional moment of inertia, and material modulus of elasticity.

In the exemplary embodiment, brush 84 is positioned in the first primary sealing surface 60 of rotating seal ring 54. Brush 84 provides foreign material removal from grooves 61 in second primary sealing surface 74 of stationary seal ring 56. Alternatively, brush 84 may be positioned in the second primary sealing surface 74 of stationary seal ring 56, where it may provide foreign material removal from grooves 61 in first primary sealing surface 60 of sealing ring 54.

Each flexible element 86 includes a first end 90 coupled to holding device 88 and a second end 92 positioned proximate to second primary sealing surface 74. In the exemplary embodiment, second end 92 of flexible element 86 contacts second primary sealing surface 74. Flexible element 86 allows relatively large motion of the unrestrained second end 92, which in turn allows flexible element 86 to clean foreign material such as debris and contaminants from grooves 61. First end 90 of each flexible element 86 is coupled to holding device 88 and second end 92 protrudes from holding device 88 towards second primary sealing surface 74. Holding device 88 is coupled to rotating seal ring 54. In some embodiments, holding device 88 may include a welded connection. In other embodiments, holding device 88 may include any connection method that permits holding device 88 to operate as described herein, such as an epoxy connection.

Figure 5:
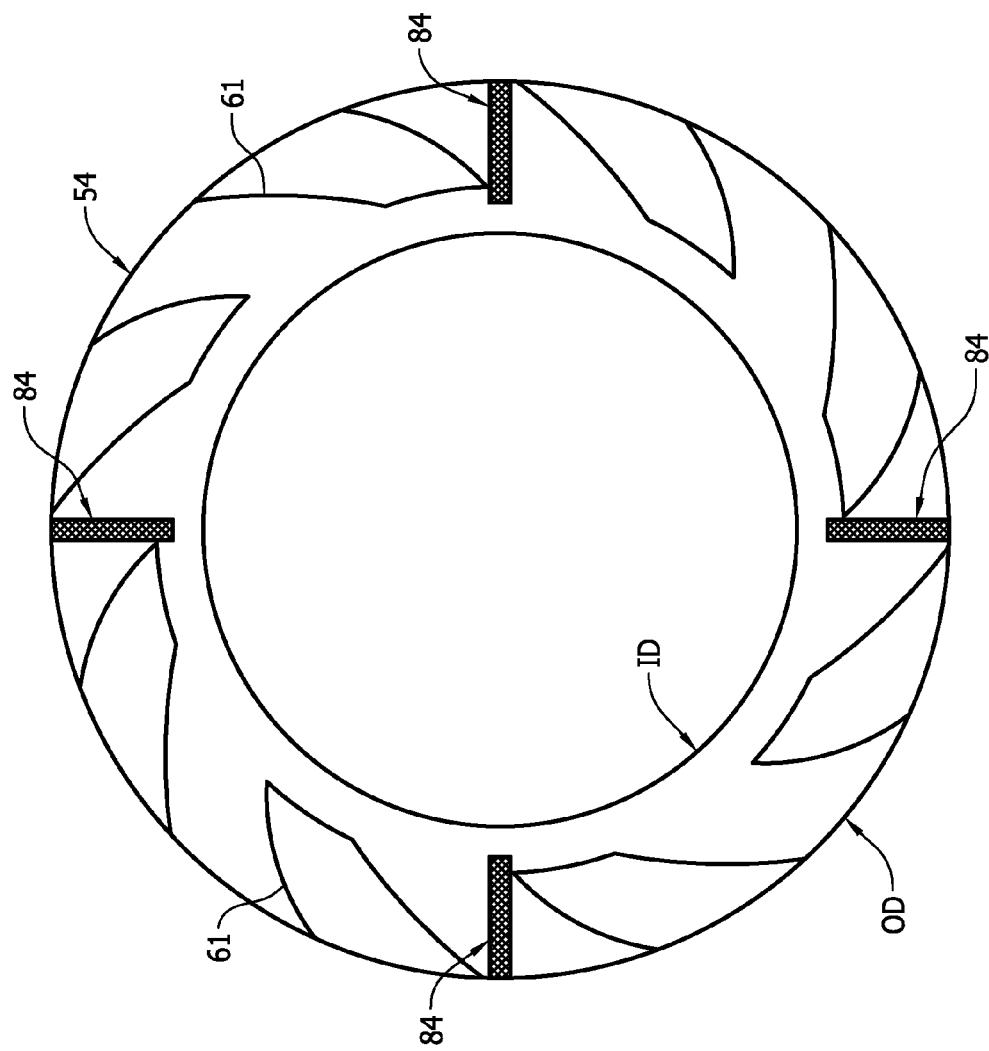

FIG. 5 is a front view of stationary seal ring 56 of face seal 52 of FIG. 3. In the exemplary embodiment, stationary seal ring 56 includes four brushes 84, each being substantially liner in shape. Each brush is substantially equally spaced apart from an adjacent brush 84. For example, in the exemplary embodiment, a respective brush 84 is located at about the 12 o'clock, 3 o'clock, 6 o'clock, and 9 o'clock positions. Alternatively, stationary seal ring 56 may include any number of brushes 84 that permit self-cleaning face seal 52 to operate as described herein. In the exemplary embodiment, brushes 84 are positioned along a radial line extending from the center axis of stationary seal ring 56. Alternatively, brushes 84 may be inclined with respect to a respective radial line. Linear brush 84 is preferably terminated before extending to seal inner diameter ID for inward sealing, or terminated before extending to seal outer diameter OD for outward sealing, to facilitate preventing the process fluid from leaking.

FIG. 6 is a schematic section view of an alternative exemplary self-cleaning hydrodynamic face seal 52 for use with steam turbine engine 10 shown in FIG. 1. Elements are numbered the same as in FIG. 3 if their functions are the same. In the exemplary embodiment, face seal 52 includes a rotating seal ring 54, a stationary seal ring 56, and a seal housing 58 concentric with and extending about centerline axis 24 of shaft 14. Rotating seal ring 54 and stationary seal ring 56 together form a primary seal 55.

In the exemplary embodiment, rotating seal ring 54 is formed integrally with shaft 14 and is rotatable therewith. Alternatively, rotating seal ring 54 may be formed as a separate part and mechanically attached to shaft 14. Rotating seal ring 54 is generally disk shaped and includes an axially-facing, first primary sealing surface 60 that includes at least one brush 84.

Stationary seal ring 56 is generally disk-shaped and has a radially-extending surface defining an axially-facing, second primary sealing surface 74 that includes channels or grooves 61 formed therein. Channels or grooves 61 direct process fluid, e.g., steam 40, between rotating seal ring 54 and stationary seal ring 56, thus forming a process fluid film layer that is generally about 0.002 inches thick or less. Alternatively or additionally, channels or grooves 61 may be formed in the rotating seal ring primary face. In an alternative embodiment, an orifice 94 extending through stationary seal ring 56 may be used to feed upstream process fluid, e.g., steam 40 between first primary sealing surface 60 and second primary sealing surface 74. Second primary sealing surface 74 is positioned against first seal component 54 in a face-to-face mating relationship with first primary sealing surface 60. First and second primary sealing surfaces 60 and 74, respectively, form a circuitous or tortuous flow path for the process fluid, e.g., steam 40.

In the exemplary embodiment, secondary seal 82 is positioned between stationary seal ring 56 and seal housing 58. Secondary seal 82 facilitates preventing leakage between stationary seal ring 56 and seal housing 58, and allows stationary seal ring 56 to slide axially to follow the translation of shaft 14 in the axial direction due to thermal expansion/contraction or thrust reversal.

In the exemplary embodiment, one or more biasing components 70, such as a spring, extend between spring seat 64 on seal housing 58 and are mounted on rods 96 attached to stationary seal ring 56. Biasing component 70 biases stationary seal ring 56 away from rotating seal ring 54. Rods 96 also operate to prevent rotation of stationary seal ring 56. Alternatively, biasing component 70 may be configured to bias stationary seal ring 56 towards rotating seal ring 54.

In the exemplary embodiment, at no pressure or a low pressure loading condition, biasing components 70 bias stationary seal ring 56 away from rotating seal ring 54. Accordingly, face seal 52 is in an open position. As pressure builds within turbine engine 10, an aspirating member 98 extending from stationary seal ring 56 and an outer surface 100 of rotating seal ring 54 cooperate to generate a pressure drop that facilitates pulling stationary seal ring 56 towards rotating seal ring 54, thus forming a seal at a loaded condition. The advantage of an aspirating design is that it allows the sealing faces to separate at no-loading condition to avoid sealing face rub.

The apparatus and systems as described herein facilitate improving rotary machine performance by providing a self-cleaning sealing assembly that substantially reduces process fluid leakage within a rotary machine. Specifically, a self-cleaning hydrodynamic face seal that includes a plurality of linear brushes is described. The linear brushes provide cleaning of the hydrodynamic features of the face seal rings, such as the face seal may maintain its sealing ability as the process fluid deposits debris and/or contaminates between the seal rings. Therefore, in contrast to known hydrodynamic face seals without self-cleaning features, the apparatus and systems described herein facilitate reducing the maintenance period of large diameter face seals and facilitate reducing the process fluid leakage from the rotary machine.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the invention has been described in terms of various specific embodiments, those skilled in the art will recognize that the invention can be practiced with modification within the spirit and scope of the claims.

What is claimed is:

1. A hydrodynamic face seal ring for use with a rotary machine, said face seal ring comprising:
    A face seal ring comprising a radially-extending seal face; and
    a plurality of brushes coupled to said radially-extending seal face, said plurality of brushes each comprising a plurality of flexible elements extending away from said seal face, at least one of said plurality of brushes being circumferentially spaced apart from the rest of said plurality of brushes.

2. A face seal ring in accordance with claim 1, wherein said radially-extending seal face is smooth.

3. A face seal ring in accordance with claim 1, wherein said radially-extending seal face has at least one hydrodynamic feature defined therein.

4. A face seal ring in accordance with claim 1, wherein said face seal ring has at least one alignment slot defined therethrough, said at least one alignment slot configured to slidably couple with a respective alignment member of a seal housing.

5. A face seal ring in accordance with claim 1, wherein each of said plurality of flexible elements comprises bristles.

6. A face seal ring in accordance with claim 5, wherein said bristles are fabricated from a metal alloy.

7. A face seal ring in accordance with claim 1, wherein at least one of said plurality of brushes comprises a holding device coupled to said face seal ring, each flexible element of said plurality of flexible elements of said at least one of said plurality of brushes comprising a first end coupled to said holding device and a second end extending from said holding device to contact a second face seal ring comprising at least one hydrodynamic feature defined therein.

8. A face seal ring in accordance with claim 7, wherein said second end of each flexible element of said plurality of flexible elements contacts said second face seal ring to remove foreign material from said at least one hydrodynamic feature.

9. A rotary machine comprising:
    a casing;
    a rotatable shaft defining a centerline axis; and
    a sealing system comprising:
        a first face seal ring comprising a first primary radial sealing surface, said first face seal ring coupled to said rotatable shaft;
        a second face seal ring comprising a second primary radial sealing surface;
        a plurality of brushes coupled to at least one of said first primary radial sealing surface and said second primary radial sealing surface, said plurality of brushes each comprising a plurality of flexible elements, at least one of said plurality of brushes being circumferentially spaced apart from the rest of said plurality of brushes; and
        a seal housing coupled to said second face seal ring and moveable therewith.

10. A rotary machine in accordance with claim 9, wherein said sealing system further comprises a biasing ring coupled between said seal housing and said second face seal ring.

11. A rotary machine in accordance with claim 10, wherein said biasing ring is configured to bias said second face seal ring away from said first face seal ring axially along the centerline axis.

12. A rotary machine in accordance with claim 9, wherein said sealing system further comprises a biasing ring coupled to said second face seal ring.

13. A rotary machine in accordance with claim 9, wherein said seal housing comprises a secondary seal positioned between said seal housing and said casing.

14. A rotary machine in accordance with claim 9, wherein said seal housing comprises at least one radially-inward extending alignment member.

15. A rotary machine in accordance with claim 14, wherein each of said first face seal ring and said second face seal ring comprise at least one alignment slot defined therethrough, said at least one alignment slot configured to slidably couple to said at least one alignment member.

16. A rotary machine in accordance with claim 9, wherein said second face seal ring comprises an aspirating member configured to cooperate with an outer radial surface of said first face seal ring to generate a pressure drop that facilitates pulling said second face seal ring towards said first face seal ring.

17. A rotary machine in accordance with claim 9, wherein at least one of said plurality of brushes comprises a holding device coupled to at least one of said first face seal ring and said second face seal ring, each flexible element of said plurality of flexible elements of said at least one of said plurality of brushes comprising a first end coupled to said holding device and a second end extending from said holding device.

18. A method of assembling a sealing system, said method comprising:
- coupling a seal housing to an inner surface of a casing of a rotary machine;
- coupling a first face seal ring including a first primary radial sealing surface to a rotatable shaft of the rotary machine;
- releasably coupling a second face seal ring including a second primary radial sealing surface concentrically to the first face seal ring; and
- coupling a plurality of brushes to at least one of the first primary radial sealing surface and the second primary radial sealing surface, the plurality if brushes each including a plurality of flexible elements, at least one of said plurality of brushes being circumferentially spaced apart from the rest of said plurality of brushes.

19. A method in accordance with claim 18, wherein at least one said plurality of brushes includes a holding device coupled to at least one of the first face seal ring and the second face seal ring, each flexible element of the plurality of flexible elements of said at least one of said plurality of brushes including a first end coupled to the holding device and a second end extending from the holding device, wherein the second end of each flexible element of said plurality of flexible elements of said at least one of said plurality of brushes is configured to contact the other of the first face seal ring and the second face seal ring.

* * * * *